US012231323B2

(12) United States Patent
Parmer et al.

(10) Patent No.: US 12,231,323 B2
(45) Date of Patent: Feb. 18, 2025

(54) AUTOMATED MULTI-NODE NETWORK PERFORMANCE TESTING

(71) Applicant: United States Cellular Corporation, Chicago (IL)

(72) Inventors: David Scott Parmer, South Elgin, IL (US); Margaret Elizabeth Dawson, Glen Ellyn, IL (US); William James Maniates, Oswego, IL (US); Kurt Holen Johnson, Barrington, IL (US); Prakash Suman, Hudson, NH (US); Andrew Scot Spear, Aurora, IL (US); Robert Ronald Jakubek, Barrington, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 25 days.

(21) Appl. No.: 17/163,935

(22) Filed: Feb. 1, 2021

(65) Prior Publication Data

US 2021/0243104 A1 Aug. 5, 2021

Related U.S. Application Data

(60) Provisional application No. 62/968,633, filed on Jan. 31, 2020.

(51) Int. Cl.
*H04L 45/50* (2022.01)
*H04L 41/0869* (2022.01)
(Continued)

(52) U.S. Cl.
CPC .......... *H04L 43/50* (2013.01); *H04L 41/0869* (2013.01); *H04L 67/10* (2013.01)

(58) Field of Classification Search
None
See application file for complete search history.

(56) References Cited

U.S. PATENT DOCUMENTS

| 2012/0253728 | A1* | 10/2012 | Chamas | G06F 11/2294 |
| | | | | 702/109 |
| 2014/0016479 | A1* | 1/2014 | Coomber | H04L 12/40013 |
| | | | | 370/241.1 |
| 2018/0004624 | A1* | 1/2018 | Singh | H04L 41/5019 |

* cited by examiner

*Primary Examiner* — June Sison
(74) *Attorney, Agent, or Firm* — Leydig, Voit & Mayer, Ltd.

(57) ABSTRACT

A network automation system platform is described herein for carrying out a method for automated multi-node performance validation testing on a communications network. The method includes acquiring a test configuration for executing a multi-node performance validation test, wherein the test configuration identifies: a multi-node network performance test, carried out by an application layer, that specifies a technology-independent test script that is generic to particular technologies for providing performance validation-related services, and a node group upon which the multi-node network performance test is to be performed. The method further includes executing the multi-node network performance validation test by the application layer issuing requests to a core layer comprising a set of technology-specific services that issue, in accordance with the application layer requests, technology-specific commands to external services during performance validation of nodes within the node group.

18 Claims, 5 Drawing Sheets

(51) Int. Cl.
*H04L 43/50* (2022.01)
*H04L 67/10* (2022.01)

AUTOMATED MULTI-NODE NETWORK PERFORMANCE TESTING

CROSS-REFERENCE TO RELATED APPLICATIONS

This application claims the benefit of U.S. Provisional Application No. 62/968,633, filed Jan. 31, 2020, the contents of which are expressly incorporated by reference in its entirety, including any references contained therein.

TECHNOLOGICAL AREA

The present disclosure generally relates to network performance testing. More particularly, the disclosure relates to automated network utilities that facilitate defining and executing multi-node network performance testing.

BACKGROUND OF THE INVENTION

The drive for organization and network engineering professionals to embrace network programmability, automation and orchestration is greater now than it has ever been, and this drive is fueled by an increase in network scale and complexity, 5G implementation, and a need for businesses to be more agile & flexible to deliver services. New network maintenance and management services are being designed and implemented. However, there is a significant mass of legacy networks that would benefit from the same concepts of programmability. It is important to provide a platform that accelerates creation of network maintenance and monitoring automation utilities and orchestrations that increase velocity of service delivery and minimize effort spent on repetitive and linearly scaling activities that operate in legacy network as well as new network technology environments. Automation and orchestration are needed that enable engineers to express a high level intent or policy, and (through automation) have such expression be quickly and easily translated into low level configuration and actions that are implemented safely into a production network.

SUMMARY OF THE DISCLOSURE

Embodiments of the disclosure are used to provide a network automation system platform on a computer system including a processor and a non-transitory computer-readable medium including computer-executable instructions that, when executed by the processor, facilitate the computer system carrying out a method for automated multi-node performance validation testing on a communications network.

The method includes acquiring a test configuration for executing a multi-node performance validation test, wherein the test configuration identifies: a multi-node network performance test, carried out by an application layer, that specifies a technology-independent test script that is generic to particular technologies for providing performance validation-related services, and a node group upon which the multi-node network performance test is to be performed. The method further includes executing the multi-node network performance validation test by the application layer issuing requests to a core layer comprising a set of technology-specific services that issue, in accordance with the application layer requests, technology-specific commands to external services during performance validation of nodes within the node group. The method also includes receiving, by the core layer, a set of responses from the external services corresponding to execution of the set of technology-specific commands by the external services during performance validation testing of the node group.

BRIEF DESCRIPTION OF THE DRAWINGS

While the appended claims set forth the aspects of the present invention with particularity, the invention and its advantages are best understood from the following detailed description taken in conjunction with the accompanying drawings, of which:

DETAILED DESCRIPTION OF ILLUSTRATIVE EXAMPLES

The disclosure provided herein addresses problems specifically faced in the particular area of maintaining legacy devices supporting cellular backhaul circuits between aggregation points and cell sites (nodes) in the network.

The present disclosure addresses a need arising from exhaustive efforts required by service providers to perform network performance (e.g. quality of service) level agreement validation of network services. For example, validating a service level provided on an Ethernet backhaul circuit. ITU-T Y.1564 defines an out-of-service test methodology to assess the proper configuration and performance of an Ethernet service. Conducting this testing on an active network requires taking the circuit out of service, reconfiguration of the devices to support the testing protocol, execution of the tests, then reconfiguration of the devices to restore production service. Performing these steps manually can take up to 1 hour and consequently typically need to be performed during off-peak traffic times (e.g., midnight to 4 AM). The current disclosure is directed to an infrastructure that facilitates automating validation operations and provides test results in several minutes. Thus, minimizing service impact.

There are several occasions that involve conducting Y.1564 Ethernet service validation:
1. New site (node) turn-up. When new sites are added to the network Y.1564 Testing is used to validate that the service level agreements specified in contracts with Ethernet Service Providers are being met. The test results are a condition of acceptance for the service being purchased.
2. CIR Upgrade/Downgrade. CIR (Committed Information Rate) specifies the maximum bandwidth provided by a circuit. CIR can be changed by an Ethernet Service Provide upon request from the purchaser of the service. Y.1564 Testing is used to validate that a change has been made per the new contract with the Service Provider.

3. Network Operations Investigation. Field Engineer's and Network Operation Center Engineer's conduct Y.1564 Tests to determine the operating parameters of a circuit. These tests are especially useful in understanding if a Service Provider's Ethernet service is honoring quality of service (QoS) markings on packets correctly in their network when circuits are operating at or above the committed information rate (CIR).

While not limited to such, a particular illustrative example of an Automated Multi-node Network Performance Testing Automation automated network is provided herein.

Figure 1:
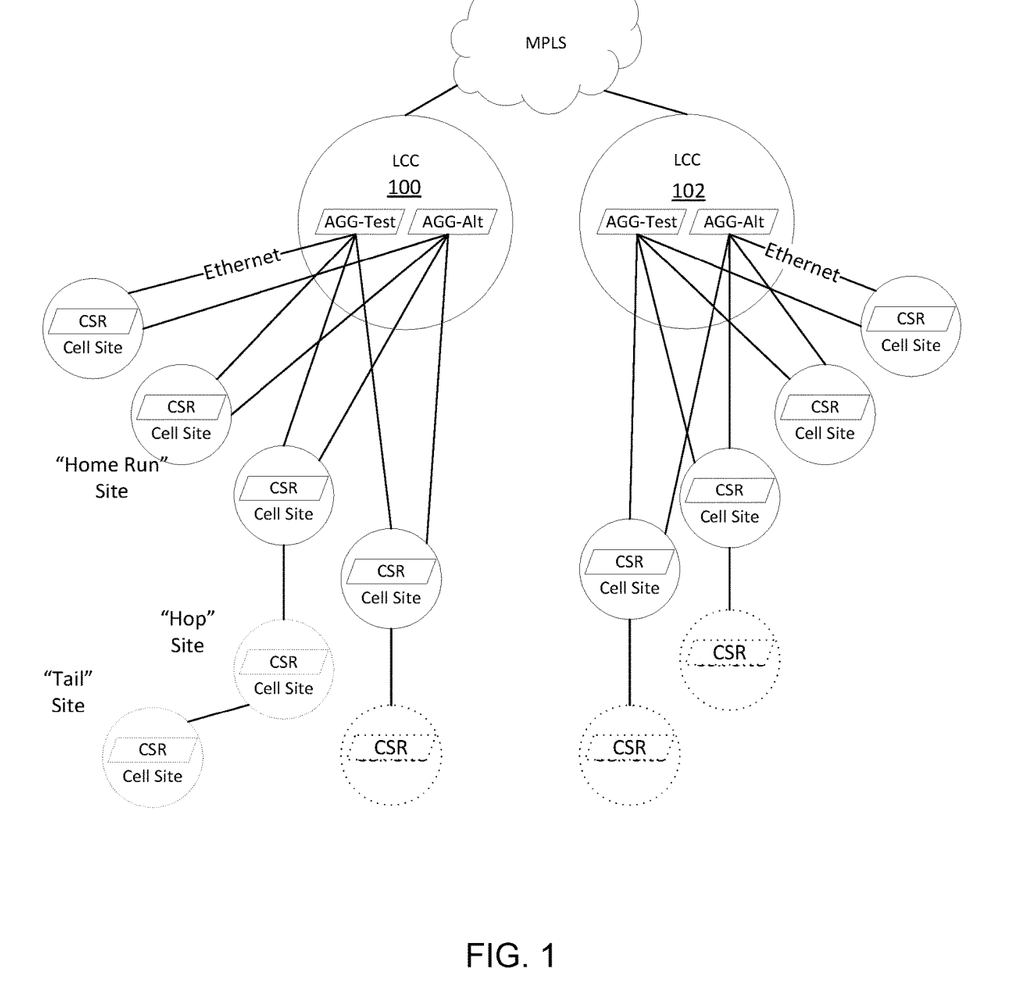
FIG. 1 is a schematic diagram illustrating a backhaul network in accordance with the present disclosure.

Turning to FIG. 1, an illustrative backhaul network is schematically depicted. Such network is an example of a type of network for which performance validation services are both desired and required. In the illustrative example, two local connectivity centers (LCC) 100 and 102 are aggregation points in an exemplary network for cell site (node) connectivity. Each LCC supports, by way of example, as many as several hundred cell sites (also depicted—albeit in reduced quantity). As indicated in FIG. 1, the cell sites (nodes) are characterized (based upon their connectivity status in relation to the LCCs 100 and 102) as "Home-Run", "Hop", and "Tail". Home-run sites are connect directly to the LCC. Hop and tail sites connect to at least one other cell site (interposed between the hop/tail site and the LCC. Each of the LCCs 100 and 102, by way of example, has a pair of aggregation routers for redundancy. Home-run sites implement 2 Ethernet backhaul circuits connected to each of the aggregation routers at a single LCC. Home-run sites are in scope for Y.1564 testing. Hop and tail sites are out of scope (with respect to the current illustrative examples) for Y.1564 testing. In the illustrative example, the LCC 100 and the LCC 102 are communicatively coupled to/via a multiprotocol label switching (MPLS) network 104.

Figure 2:
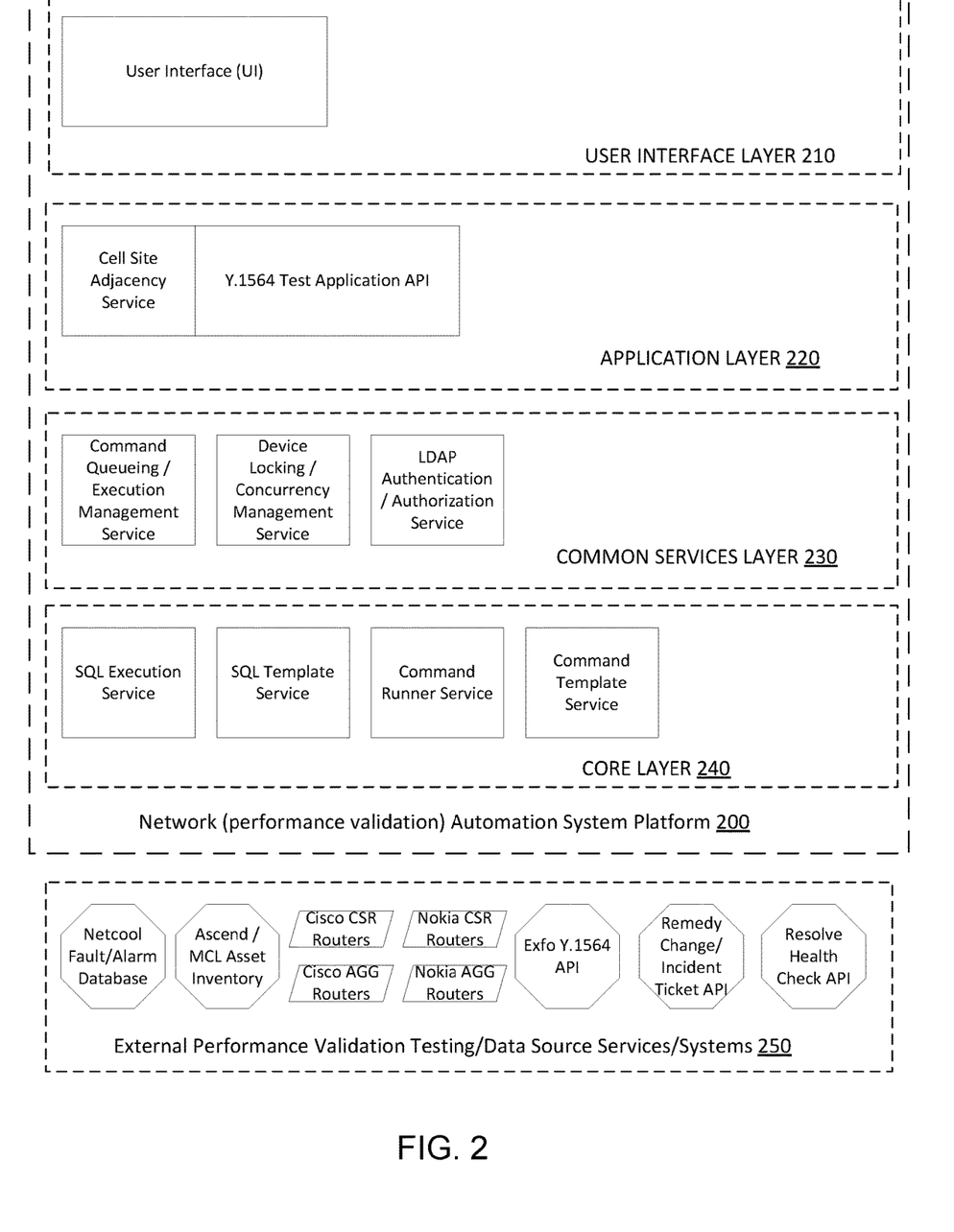
FIG. 2 is a detailed schematic diagram of an exemplary NAS architecture for carrying out the network side (node) performance validation in accordance with the disclosure.

Turning to FIG. 2, a detailed schematic diagram is provided of an exemplary NAS platform 200 architecture for carrying out the network side (node) performance validation in accordance with the disclosure. The NAS platform 200, by way of an illustrative example, is implemented using microservices communicating via representational state transfer (REST) interfaces that use the hypertext transfer protocol secure (HTTPS) protocol. As shown in FIG. 2, the NAS platform 200 comprises, by way of example, a multitude of microservices arranged in four distinct layers: a User Interface 210, an Application Layer 220, a Common Services Layer 230, and a Core Layer 240.

The User Interface Layer 210 implements the user interface. It can be implemented using different frameworks as needs permit. For example, for more interactive web interfaces Angular web framework is implemented. For more simple interfaces, a basic web framework can be used. All communications to support the user interface are performed by REST API calls to the Application Layer 220. In a particular implementation, the UI Layer 210 uses Angular because it provides workflow widgets and provides the ability for dynamically updating screen elements as events complete during execution. For example, a widget in a "Current Step" column UI element is updated as steps in the solution are executed. This provides the user with information regarding the progress of the automation without needing to refresh the entire UI display.

In the illustrative example, the User Interface Layer 210 interacts with the Application Layer 220 via REST interfaces. This allows the UI Layer 210 to be developed using different web development frameworks. This is dictated by the complexity of the user interface. When there are higher levels of interactivity required, modern JavaScript/HTML5 frameworks such as Angular can be used. When UI requirements are more basic, simple HTML based development can be used. Maintaining a separate layer via REST allows for multiple approaches tailored to the design requirements.

The Application Layer 220 implements business logic for automation and/or orchestration of the NAS Platform 200. By way of example, each application has a Postgres DB instance to hold working data for the application. All communications to/from the application layer are performed via REST API calls. For more simple implementations of the NAS Platform 200, the User Interface Layer 210 and the Application Layer 220 can be combined.

The Application Layer 220 is focused on implementing the business logic and, as such, provides REST interfaces to the User Interface layer 210 and communicates via REST calls to services of the Core Layer 240 and the Common Services Layer 230. As such, complexity of the Application Layer 220 is reduced because vendor-specific details of interfaces to the external services 250 are abstracted by the Core Layer 240 and the Common Services Layer 230. This allows solutions implemented at the Application Layer 220 to be extended to new external systems with minimal to no impact on the business logic of the Application Layer 220. For example, introduction of testing of a new router model would have no impact on Application Layer 220 business logic—such changes are handled by modifying components of the Core Layer 240.

The Application Layer 220 often has a working database that contains transitory data for the application as well as transactional information for reporting specific to the solution.

The Common Services Layer 230 provides services common to most projects. These include concurrency management, user authentication and access control, network device error handling and retry logic. The Common Services Layer 230 is the primary mechanism for the Application Layer 220 to interface with devices via command line interfaces (CLI).

The Core Layer 240 interfaces with back-end systems, databases, network elements and/or APIs. The Core Layer 240 provides an abstraction layer for vendor specific interfaces that allows business logic in the Application Layer 230 to be implemented without technical vendor complexity. In the illustrative example, a SQL execution service component standardizes communications between the Application Layer 230 and external databases.

With continued reference to FIG. 2, an exemplary set of external systems accessed via the Core Layer 240. By way of example, a set of External Network Validation Systems 250 are accessed by the NAS Platform 200 via the Core Layer 240. Devices in scope for Y.1564 test automation in current phase include, for example: Cisco CSR (ASR 901 & ASR 903) and Aggregation Routers; mobile wireless data network service provider systems such as NetCool. Health Check API, EXFO Worx & ASCEND are interfaced via the Core Layer 240 with the NAS Platform 200.

The NAS Platform 200 interfaces with the network devices and tools mentioned below for a successful automation. Various types of connection methods such as command line runner, XML interfaces and API interfaces are used. The NAS platform 200 also includes parsers which convert command outputs from the external network validation systems 250 into consumable data.

Referring to the external network validation systems 250 examples, in the illustrative example, an ASCEND database is used. ASCEND is a Oracle database (DB) populated with data from multiple mobile wireless data network service provider systems. Ascend is the source for VLAN Record with information about the CSR/AGG Router, Primary/Secondary VLAN ID, Backhaul Speed and Site BH Type (Homerun, Hub, Hop, Tail), LCC.

A Health Check API system is used to streamline and automate processes. Health Check API implementation provides a single field search page for users to enter site ID, retrieve VLAN data from Ascend and perform one-click action for Health check and Alarm check on selected nodes. A Y.1564 automation solution interfaces with the Health Check API via APIs to invoke health check and alarm check.

By way of a specific example, the system uses the IBM Netcool Network Management tool that generates alarms to be viewed by the mobile wireless data network service provider to discover, detect, and remediate issues on the mobile wireless data network service provider networks.

By way of a specific example, the mobile wireless data network service provider uses EXFO Worx software engine for performing Y.1564 testing. EXFO Worx is a service assurance and performance management tool. The web-based EXFO Worx Operations Center controls all aspects of test such as specification of service-level objectives, scheduling tests, configuring EXFO Verifier settings, and creating detailed performance reports.

Users, by way of example, login to the NAS platform 200 using their mobile wireless data network service provider LAN-ID and password. Users are assigned to different groups based on their access level. Access to different applications on NAS platform is controlled by the user group assignment.

Figure 3:
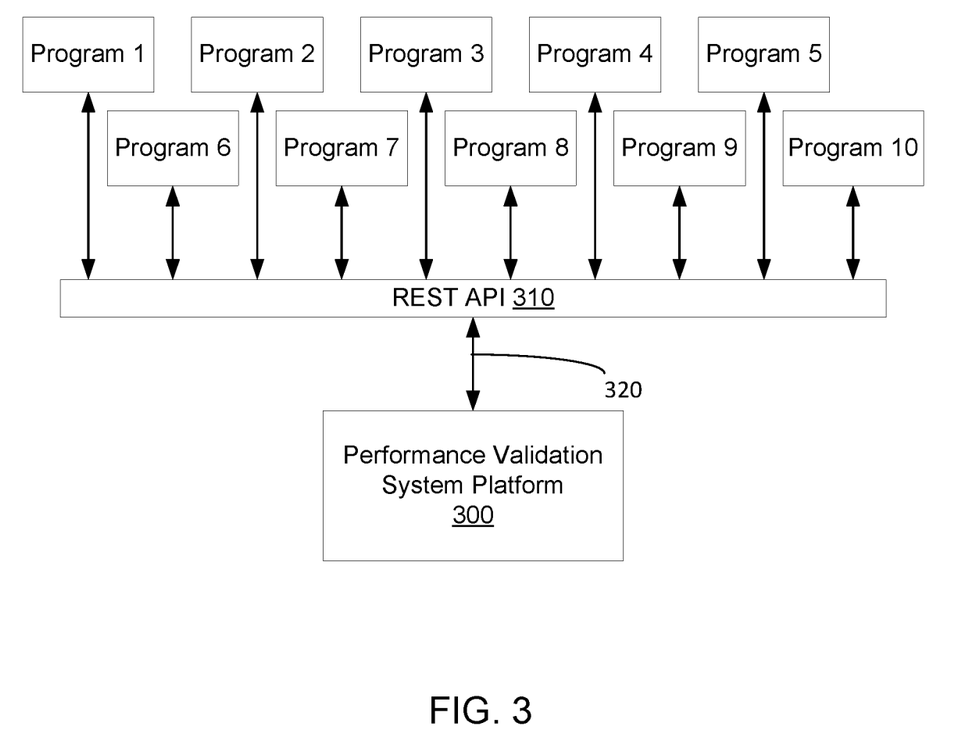
FIG. 3 is a schematic diagram of an application integration architecture in accordance with the current disclosure.

Turning to FIG. 3, a schematic diagram is provided of an application integration architecture in accordance with the current disclosure. To address a fundamental challenge of a multi-vendor environment in the area of parameter validation testing (execution and subsequent data delivery), the NAS Platform 200 of FIG. 2 comprises an abstraction layer at the base (i.e. the lowest layer where the NAS Platform 200 interfaces the multitude of vendor applications). This approach, schematically depicted in FIG. 3, contrasts with an approach of directly integrating at a system/database layer directly for each system or network element—an approach that necessitates supporting many integration points.

The external application interface architecture depicted in FIG. 3 (depicting ten distinct programs interfacing a performance validation system 300), reduces the number of integrations that are maintained between systems by encapsulating systems that support a cohesive business function within a representational state transfer (REST) application program interface (API) 310. All integrations between consuming systems are written to the REST API instead of directly to the system within the NAS Platform 200. Thus, in the program interface arrangement depicted in FIG. 3, when the "system" is upgraded only a single system-API interface 320 needs to be updated (and thereby avoiding a need to update 10 distinct external application interfaces).

The NAS platform 200, in accordance with the present disclosure, incorporates the REST API architecture and microservices principles. As is known in the art, REST is an architectural style defined by the following attributes:
1) Client-Server: The technology details supporting the REST API are abstracted. The REST interface is not affected by the operating system, server hardware, database, programming language, etc. that is being used by the client or the server. This provides portability and allows the components to scale independent of the interface.
2) Stateless: The server will not maintain state information. Each request made by a client will contain all the information to service the request. If state information is required, the client maintains it. This also provides scalability by supporting load balancing and microservices architectures (e.g., Docker/Kubernetes).
3) Uniform Interface: Standard methods such as with HTTP are used (get, put, post, delete) along with a base URL that provides details on the resources available. A media type is defined that tells both the client and the server how to parse the requests.

Implementing REST APIs (so that the NAS platform 200 incorporates the API interface architecture schematically depicted in FIG. 3, provides abstraction from the technology used by the systems. As long as the system in question supports the REST API standard it does not matter if the underlying technology is an IBM Mainframe running DB2, an Oracle Solaris server running Oracle DB, an Ericsson eNB, a Nokia eNB, or a cluster of Hadoop servers running HDFS. The interface will work the same for any client making a request.

As noted above, the NAS platform 200 also incorporates a microservices architecture. The NAS architecture is based on the concept of microservices. A microservices application is built by putting together components made up of small, independent services that communicate via HTTP. Each service is a stand-alone component that can be instantiated on the same or different hardware/operating system platforms. This is in contrast to a more traditional software design approach, monolithic, in which all services are implemented in a single process that communicate via function calls.

The advantage of a microservice based approach is that the services can be leveraged to support multiple products when designed carefully. By following REST principles it also provides scalability. This is especially true when deploying services on a container platform such as Kubernetes. Kubernetes can provide automated scaling and load balancing services when used.

By way of example, the NAS platform 200 is implemented using several open source languages and frameworks. Core open source solutions used include:
1) Python: Programming language for back-end development. Python is a leading programming language with many packages (or modules) to simplify programming.
2) Django: Web development framework that provides an object relational mapper and allows for very fast development of applications with back-end database servers. Django also provides a REST programming framework to speed development of REST interfaces.
3) RabbitMQ: Open source message bus that provides standard messaging queues and facilitates asynchronous messaging, concurrency control, and command execution.
4) Postgres: A relational database platform used for persistent data requirements.
5) Angular: A user interface development framework that provides a rich HTML5 user experience.

Figure 4:
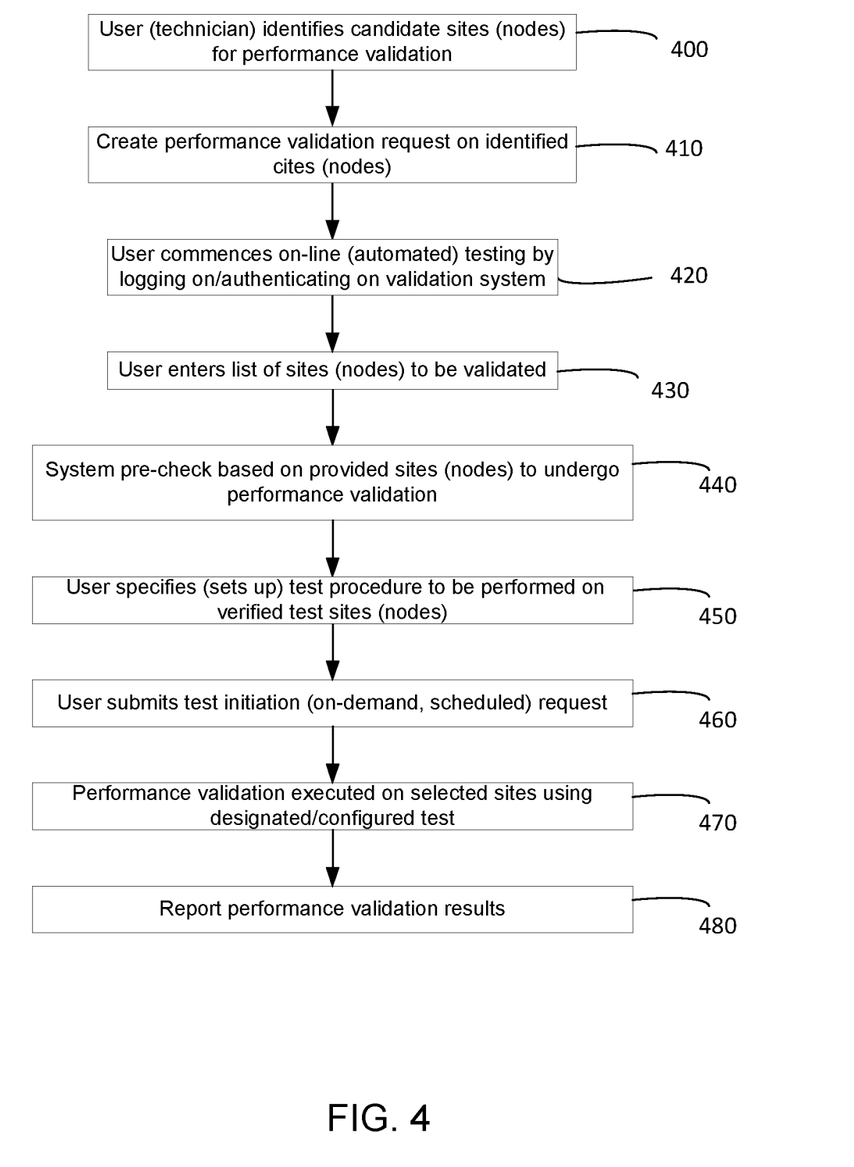
FIG. 4 is a flowchart summarizing operations for an exemplary automated testing carried out by the exemplary network operation validation infrastructure in accordance with the disclosure.

Having described an illustrative network and NAS infrastructure for carrying out network site (node) validation testing, attention is directed to FIG. 4 that provides a flowchart summarizing operations for an exemplary automated testing carried out by the exemplary network operation validation infrastructure described herein. The objective of the orchestration infrastructure described in the provided illustrative example is to facilitate automating a Y.1564 Testing test execution process flow that measures QoS and performance of the telecommunications service provider Ethernet backhaul connections between the mobile wireless data network service provider cell site routers (CSR) and aggregation routers (AGG) located at local connectivity centers (LCC). The validation operation commences in response to a triggering event such as a user-initiated command from a user (e.g. Network Field Engineer (NFE) or a Network Operation Center (NOC) Engineer.

With continued reference to FIG. 4, the following operations are performed in accordance with an exemplary Y.1564 operation validation/testing procedure. During 400, a user identifies sites (nodes) that are to be the subject of the Y.1564 performance validation testing. Such sites may comprise multiple sites selected across multiple aggregation routers in a network. Thereafter, during 410 the user creates a change control request (for approval) to perform validation testing on the sites identified during 400.

Upon approval of the change control request, during 420 the user initiates the Y.1564 test automation operation. By way of example, an authentication is carried out on a set of user-provided credentials using, for example, using Lightweight Directory Access Protocol (LDAP) authentication. More particularly, LDAP group membership is used to authorize the user to the validation operation.

Upon validation of user credentials (logon), during 430 the user enters sites that are to be the subject of the validation testing. By way of example, a Y.1564 test automation user interface provides a search field facilitating site (node) identification by the authenticated user. By way of example, the user may also enter site identifications by entering (e.g., typing or pasting) the site IDs (comma separated) from a different document (such as a change control ticket). Users can enter site IDs from multiple markets.

Thereafter, during 440, the site (node) performance validation/testing platform performs, by way of example, the following pre-checks on the identified site(s) one by one, for example, in a sequential order:
1. Site Inventory check—verify if site is present in the asset database and fetch site details. For identified sites having no records in the asset database, the an error message is displayed stating "Invalid Site ID"
2. Pre-test alarm check—perform an initial alarm check (at the time of request submission). API call to the fault management application is used to perform alarm check.
3. Pre-test health check—perform an initial health check on the router (at the time of request submission). Commands executed on the devices and checked against pre-defined expected conditions.

By way of a particular illustrative example, during 440 the following pre-performance validation testing operations are performed. Upon successful completion of asset inventory validation the platform triggers 'pre-test validation' for (both) VLANs at the site. In a particular illustrative example, pre-validation consists of the following:
1. Pre-check: connectivity to routers, ensure that details required for test run (such as Egress-Port-QGrp, MAC addresses etc.) are present on the router as expected, connectivity to Health Check APIs (if skip health/alarm checks are not selected as part of test options during test setup), and connectivity to EXFO API.
2. Pre-Test Health Checks—Using Health Check API.
3. Pre-Test Alarm Checks—Using Health Check API As part of pre-validation, connectivity to device, Health Check API endpoints and EXFO API endpoint will be validated. The NAS platform 200 connects to CSR and the AGG routers to check if the configuration on the routers is as expected and if the devices are fit for running the Y.1564 Test. This operation is performed to identify any configuration issues with the routers that would result in failure of the performance validation tests.

When site details are retrieved from ASCEND, the hostname of the CSR is stored as <hostname> for next steps. In the illustrative example, availability of site details in ASCEND is a pre-requisite, and without such site details the automated performance validation testing cannot be triggered. The automated testing services validate the CSR device type, and in the case of an unsupported device type a "1001" device type is returned to inform the user that the device is an unsupported device type. A warning pop-up is presented on the UI.

After health and alarm checks are run on the devices, the automation parses and saves the response of health check and alarm check to identify number of active alarms on the site. After post-test alarm and health checks, the automation should parse for alarm or health check conditions to make sure no new alarms have been introduced after the test.

During 450 the user configures a performance validation procedure to be executed on the validated sites (nodes) upon which the performance validation is to be performed. By way of example, the user: selects a purpose (reason) for conducting the Y.1564 test (e.g. from a dropdown list of options); selects one or both available VLANs for carrying out the test; enters a change ticket number (followed by a validation performed to ensure that valid change ticket number is provided and site(s) under test are listed as "Impacted Sites" in the ticket); selects a test template (from a set of pre-defined performance validation test sequences); sets up test parameters in the 'Test Parameters' section (for a particular selected test template); and uses the 'Test Options' section to select skip or override alarm and health checks.

During 460 the user initiates performance validation testing. By way of example, the validation platform user interface presents the user with an option to either 'Execute Now' (on-demand test) or 'Execute Later' (scheduled test). All the sites selected together and submitted for execution are referred to as "Work Orders". Each "Work Order" has a unique identifier. If user selects 'Execute Later': a calendar modal is displayed to user to select the date and time for execution; the user selects date and planned start time for execution; a confirmation message is displayed to the user and the Work Order with test(s) is triggered as a scheduled test. On the other hand, if the user selects 'Execute Now', the Work Order with test(s) is triggered as an on-demand test.

Thereafter, during 470 the performance validation platform executes the configured performance validation on the provided configuration. By way of example, the performance validation operates upon the multiple configured sites (nodes) in accordance with the provided validation constraints. For example, the validation constraints may include bandwidth limitations (based on test type selected) and number of concurrent executions allowed on an aggregation router.

During the testing, by way of example, during alarm and health checks, the NAS platform 200 interfaces a Health Check API system via REST API calls. For test readiness and test restoration stages (described herein below), the NAS platform 200 interfaces, by way of example, with respective Nokia and Cisco routers to make configuration changes. To trigger the Y.1564 performance validation testing, the NAS platform 200 interfaces with EXFO system.

Test execution includes, by way of example, the following steps (performed on each site (node) and executed in sequential order as follows:
1. Pre-validations—Pre-validation is introduced in this phase so that additional checks are performed before even initiating the process of running commands on devices.
2. Pre-alarm check (executed if "skip alarm check" checkbox is not selected in test setup).
3. Pre-health check (executed if "skip health check" checkbox is not selected in test setup).
4. Test readiness (in case of failure, rollback is attempted, and fault alarms are raised based on success/failure of rollback). This operation includes configuring the devices to enable test execution. This involves changing the OSPF layer 3 production routing configuration to a layer 2 VLAN configuration on the CSR and AGG router for the VLAN under test.

A particular illustrative example is provided below for the "Test readiness" stage. The NAS platform 200 initially connects to a selected CSR. Based on a provided site identifier and selected CSR, the loopback IP address of the CSR is identified from the VLAN layout record. The CSR loopback IP address is used to connect to the router using SSH. Thereafter, the NAS platform 200 connects to the CSR and commences running the following commands (the values of parameters for these commands are retrieved and saved in the previous steps):
  i. configure terminal
  ii. interface <CSR-BHP1>
  iii. no service-policy output <CSR_EGR>
  iv. service instance <SVC_INS1> ethernet <EVC_NUM1>
  v. ethernet loopback (permit external
  vi. end After each command the router prompt should enter/exit the router context—e.g. (hostname #, hostname (config), hostname(config-if)).

Error Conditions: If the router doesn't return to the desired prompt after any command, then that situation is considered as a process-affecting error. In cases of process-affecting error the execution is stopped and rollback is triggered. If the rollback is successful display an 'orange' alert on the UI, else display a 'red' alert on the UI. For both 'orange' and 'red' alerts a Netcool alert is raised The table below provides examples of rollback criteria and commands

| S. No. | Command | Rollback applicable? (Yes or No) | Rollback Command |
|---|---|---|---|
| 1. | interface <CSR_BHP1> | N | N/A |
| 2. | no service-policy output <CSR_EGR> | N | N/A |
| 3. | service instance <SVC_INS1> ethernet <EVC_NUM1> | Y | service-policy output <CSR_EGR> (under config-if context) |
| 4. | ethernet loopback permit external | Y | service-policy output <CSR_EGR> (under config-if context) |

If a router prompt returns a root context, each verifier has two mac addresses based on the test interface. Hence, both MAC addresses are stored for each verifier, and based on the test interface, one of the MAC addresses is used. If a process-affecting error is encountered, the execution should stop and rollback is triggered.

Next, the NAS platform 200 verifies loopback is configured and active. If the command verifying loopback returns an error (any output other than returning to the root prompt) or loopback is not active or the Total external session(s) is zero, then the situation is considered as a process-affecting error and the execution is stopped and rollback is triggered.

Testing readiness also includes testing the AGG router by initially connecting to the AGG router and requesting to see all interfaces connecting to the AGG router. From the result, the interface going to the CSR (usually denoted by 'to_CSRhostname' in the description column) is identified. The value of the interface name is parsed and saved as <Agg_Int>, Port as <Agg_Port> and Vlan ID as <Agg_VLN> (Ex: Interface name—Gi0/0/0/19.1133, Port Gi0/0/0/19, VLAN ID 1133). A command is issued to identify the description, service-policy, IPV4 address and VLAN ID. The router response is parsed and saved as follows:
  Description string—<Agg_Des>
  Service policy output—<Agg_Egr>
  IPv4 address—<Agg_IP>
  Subnet Mask—<Agg_SNM>
  Dot1q—<Agg1_Dot1q>
  (Ex: From the screenshot above, Description string is 'to_cla-asr903-02', Service policy output is 100 Mbps-Backhaul-Egress, IPv4 address is 10.5.52.16, Subnet Mask is 255.255.255.254 and Dot1q is 1133)

If the BH port and/or VLAN does not exist on the AGG router, then that situation is considered a process-affecting error, and execution is stopped and rollback triggered to undo the changes on the CSR (since no changes are made on the Agg-Test). The UI displays an appropriate result of the command, and a Netcool alert is raised indicating any error and status of the subsequent rollback.

Continuing the testing readiness, ASCEND is used to validate data. For example, a Dot1q number retrieved from the AGG router (<Agg1_Dot1q>) is compared to ASCEND database. If the values retrieved from the router and ASCEND match then it is a 'Go' condition (no action needed on Netcool and UI). However, any mismatch is a non-process affecting error and is highlighted on the UI in 'yellow' and the automation should proceed.

Testing readiness further includes validating connectivity between the CSR and AGG router. The NAS platform 200 issues a command with IP address value parsed and stored from router response to validate connectivity. If the router output indicates an error, the error is a process-affecting error, and since there are no changes made on the AGG router at this point, rollback is triggered only on CSR.

Testing readiness proceeds by connecting to an AGG-Test router. By way of example, the following commands (in order of sequence) are issued/executed:
  i. Configure
  ii. no interface <Agg_Test_Int>
  iii. show configuration
  iv. commit Since the commands are committed after config changes are made, the valid error scenario here would be the 'commit' fail. If the commit fails, it is classified as a process-affecting error. In the case of process-affecting error, execution stops and rollback (CSR only, as no changes are made to Agg-Test) is triggered. If the rollback is successful, a Netcool alert of medium severity is raised and an 'orange' alert is displayed on the UI. If the rollback is not successful, a Critical severity Netcool alert is triggered and a 'red' alert is displayed on the UI.

Testing readiness proceeds by adding an L2 interface by connecting to the Agg-Test router and running the following commands (in order of sequence):
  i. config
  ii. interface <Agg_Test_Int> l2transport
  iii. encapsulation dot1q <Agg_Test_VLN>
  iv. ethernet egress-filter strict
  v. l2vpn
  vi. bridge group bg-exfo-vpls bridge—domain bd-exfo-vpls interface <Agg_Test_Int>
  vii. show configuration
  viii. commit
  ix. end Since the commands are committed after config changes are made, the valid error scenario here is a 'commit' fail. If the commit fails, it is classified as a process-affecting error, and execution stops and rollback (CSR and Agg-Test as per the table below) is triggered.

| S. No. | Command | Rollback applicable? (Yes or No) | Rollback Command |
|---|---|---|---|
| 1. | Configure | Y | Commands from 'Restoration → Agg-Test → Add L3 interface' 'Restoration → CSR' |
| 2. | For rest of the commands in 'Add L2 interface' section | Y | Commands from 'Restoration → Agg-Test → Add L3 interface' Restoration→ CSR' |

Testing readiness proceeds by connecting to the Agg-Test router. From the result of the connection attempt, the interface going to the CSR (usually denoted by 'to_CSRhostname' in the description column) is identified, and the value of the interface is parsed and saved in the following format: name <Agg_Alt_Int>, Port <Agg_Alt_Port> and Vlan ID <Agg_Alt_VLN>. E.g., Interface name—Gi0/0/0/19.1133, Port Gi0/0/0/19, VLAN ID 1133).

The NAS platform 200 identifies the description, service-policy, IPV4 address and VLAN ID by request to the router. From the router response, the output is parsed and saved as below:
  i. Description string—<Agg_Alt_Des>
  ii. Service policy output—<Agg_Alt_Egr>
  iii. IPv4 address—<Agg_Alt_IP>
  iv. Subnet Mask—<Agg_Alt_SNM>
  v. Dot1q—<Agg2_VLN_ID>
      (Ex: From the screenshot above, Description string is 'to_cla-asr903-02', Service policy output is 100 Mbps-Backhaul-Egress, IPv4 address is 10.5.52.16, Subnet Mask is 255.255.255.254 and Dot1q is 1133)

If the BH port and/or VLAN do not exist on the AGG router, the situation is considered a process-affecting error condition and the execution is stopped and rollback is triggered to undo the changes on the CSR and Agg-Test.

Testing readiness also includes validating data with ASCEND. The Dot1q number retrieved from the AGG router is compared to ASCEND database. If the values retrieved from the router and ASCEND match then it is a 'Go' condition (no action needed on Netcool and UI). Any mismatch is a non-process affecting error and the automated testing proceeds.

Testing readiness also includes validating connectivity between the CSR and AGG router. After issuing a command pinging the AGG router. The ping response is parsed to validate ping success. If the ping is not successful, then this is a process-affecting error (since there are no changes made on the AGG router at this point) and rollback is triggered on the CSR.

Testing readiness proceeds by removing the L3 interface by connecting to the AGG-ALT router and then running the following commands (in order of sequence):
  i. Configure
  ii. interface <Agg_Alt_Int>
  iii. shutdown
  iv. commit If commit fails, then this situation is a process-affecting error and execution is stopped and rollback is triggered for Agg-Test and CSR.

5. Test execution (the NAS platform 200 actually performs performance validation testing and accumulates test data). When a user enters a site identifier via the user interface, the NAS platform 200 displays, via the UI, a list of required parameters to set up an Y.1564 Performance Turn-Up test. The performance validation testing is run leveraging the template functionality available in EXFO Worx Tool.

Default test parameters are shown on the screen and the user will have an option to edit the values. Information about the input parameters for the Y.1564 Performance Turn-Up test are provided below. Such parameters are entered on the front-end UI will be processed and sent to ExfoWorx tool via an API.

Regarding the test parameters, the Y.1564 test automation component of the NAS platform, utilizes templates to aid/simplify setting the parameters via the UI. Most of the values are set in the templates and some are generated and populated by code (such as Verifier, Tag, Source Interface, Destination MAC address etc.). The test values such as CIR, CBS burst size etc., will be auto-populated based on ASCEND queries and default values, but the user will still have the option to change them before test execution.

| Parameter | Default Value | Displayed on Front End (Yes or No) |
|---|---|---|
| CIR | Committed information rate in Kbps. This is the service rate guaranteed in SLA. This value will be auto-populated from ASCEND data | Yes (user editable) |
| CBS Burst Size | Committed burst size. This value will be set to a default size of 128000 bytes | Yes (user editable) |
| Maximum Delay Variation Threshold | Option to configure maximum delay variation threshold for the test. Default value is set to 4000 microseconds. | Yes (user editable) |
| Delay Threshold | Option to configure delay threshold for on demand test. Value ranges from 15-8000000 micro | Yes (user editable) |

-continued

| Parameter | Default Value | Displayed on Front End (Yes or No) |
|---|---|---|
| | seconds. Default value is set to 20000 micro seconds. | |
| Frame Loss Threshold | Option to select frame loss threshold for on demand test. This is the maximum percentage of frame loss allowed for test to pass. Value can range from 0.001 to 5. Default value is 0.0001% | Yes (user editable) |
| Frame Size (Values) | For Fixed, default is 1500 and user editable. For Random, user to provide min and max values (default are 64 and 1518 respectively). For Emix, 64, 128, 256, 512, 1024, 1280, 9600 bytes, default is 64 | Yes (user editable) |
| Verifier | The default value will be auto-populated based on the site ID/hostname of the CSR | No (Populated based on logic provided) |
| Tag | Auto-populated based on the format agreed upon 'Site_VLANID_CIR_CBS_MMDDYYYY-HH:MM' | No (Populated based on logic provided) |
| Source Interface | The source interface highlights the interface to be tested. Test interface 1 will be default for odd primary and even secondary vlans. Test interface 2 will be default for even primary and odd secondary vlan. | No (Populated based on logic provided) |
| Run Network Configuration Subtest | Selected by default. Includes checkboxes for Ramp Test (checked by default) and Burst test (checked by default) | No (Template) |
| Run Service Performance Subtest | Checkbox selected by default. This option is selected when user want to run test for service performance subset. | No (Template) |
| Step Time | Value can range from 5 secs to 60 sec. Default 5 seconds | No (Template) |
| Service Performance Test Duration | The time for the Service Performance subtest to The default value is 60 seconds. | No (Template) |
| Step Value | This is the percentage of CIR configured. Default options are 50%, 75% and 90%. | No (Template) |
| Encapsulation Type | The type of loopback to be performed. Options: OAM, Layer2, Layer 3, Layer 4. Default value should be OAM | No (Template) |
| Destination MAC Address | The destination MAC address of the target device (interface under test) This will be auto-populated based on previous steps | No (Populated based on previous steps) |
| Burst Max Rate | Burst Max Rate. Set to 0.95 Gbps | No (Template) |
| Frame Size Mode | Specifies the size of each frame to be sent. Options: Fixed, Random, Emix. Default value is 'Fixed' | No (Template) |
| Stacked VLAN | 0—No VLAN tags are available, 1—One VLAN tag (C-VLAN) is available. 2—Two VLAN tags (C-VLAN and S-VLAN) are available. 3—Three VLAN tags are available. The C-VLAN, S-VLAN, E-VLAN. The default values: Stacked VLAN = 2, C-VLAN default to 4004, S-VLAN is set to test VLAN | No (Populated based on previous steps) |

6. Test restoration (in case of failure, fault alarms are raised). Reconfigure the devices back to their original layer 3 (L3) routing policies. Test restoration includes initially connecting to the Agg-Test router and then running the following commands (in order of sequence):
   a. configure
   b. interface <Agg_Alt_Int>
   c. no shutdown
   d. commit If commit fails, then this situation is a process affecting error and the Y.1564 automation attempts to restore the Agg-Test and CSR routers.

Test restoration includes validating data with ASCEND. In particular, the NAS platform 200 runs the following command:
   show run interface <Agg_Alt_Int>

The validating response output is parsed and compared to the response output during the Testing Readiness phase (described previously herein above). During the comparison, any mismatch between the two compared response data sets is a process-affecting error and the Y.1564 automation application should proceed to restore the Agg-Test and CSR.

Test restoration furthermore includes validating connectivity between the CSR and AGG routers. The NAS platform 200 pings the AGG router with the IP address value parsed and stored from Test readiness phase to validate connectivity between CSR and Agg-Alt. Parse the output for validating ping success. If the router output returns an error, then this is process affecting error and automation attempts to restore the devices Agg-Test and CSR.

Test restoration includes removing the L2 test interface. The NAS platform 200 carries out this task by connecting to the Agg-Test router and running the following commands (in order of sequence):
   a. Configure terminal
   b. no interface <Agg_Test_Int>
   c. l2vpn bridge group bg-exfo-vpls bridge-domain bd-exfo-vpls
   d. no interface <Agg_Test_Int>
   e. show configuration
   f. commit Since the commands are committed after config changes are made, the valid error scenario here would be the 'commit' fail. The commit fail is classified as a process-affecting error and automation tries to restore the devices Agg-Test and CSR.

Test restoration further includes adding the L3 interface. The NAS platform 200 carries out this task by connecting to the Agg-Test router and running the following commands (in order of sequence):
  g. interface <Agg_Test_Int> description <Agg_Test_De3>
  h. interface <Agg_Test_Int> service-policy output <Agg_Test_Egr>
  i. interface <Agg_Test_Int> ipv4 address <Agg_Test_IP>
  j. interface <Agg_Test_Int> encapsulation dot1q <Agg1_Dot1q>
  k. show configuration
  l. commit
  m. end Since the commands are committed after config changes are made, the valid error scenario here would be the 'commit' fail. The commit fails is classified as a process-affecting error and automation tries to restore the CSR.

Test restoration further includes making, with regard to the CSR, configuration changes and stopping active loopback. To accomplish this, the NAS platform 200 connects to the Cell Site Router (CSR) and stops the loopback by issuing the following exemplary command
  ethernet loopback stop local interface <CSR_BHP1> id <LPB_SES>

If the automation is unable to stop the loopback or the router returns error, it is a non-process affecting error, as the router loopback is timed and will be automatically stopped when the timeout setting is reached.

Loopback configuration on the CSR is time bound, loopback automatically stops if the set time value exceeds in this case the output looks as below. However, this is not a process affecting error, as the router loopback is timed and will be automatically stopped when the timeout setting is reached. Automation to display a yellow alert indicating non-process affecting error.

Regarding making configuration changes (restoring settings), the NAS platform 200 runs the following commands to restore the settings on the CSR:
  n. Configure terminal
  o. Interface <CSR_BHP1>
  p. Service-policy output <CSR_EGR>
  q. Service instance <SVC_INS> ethernet
  r. no ethernet loopback permit external
  s. end If the router doesn't return to the desired prompt after any command, then that situation is considered a process-affecting error and the automation proceeds with restoration, if possible.

Regarding saving configuration changes, the NAS platform 200 runs a command to write the configuration changes to memory.

The NAS platform 200 also executes commands to compare the running configuration of the CSR router with the configuration previously saved during the Testing Readiness stage (described above).

7. Post-health check (executed if "skip health check" checkbox is not selected in test setup). After successful test execution and test restoration, the automation solution performs a round of health check and alarm checks on the routers. The Alarm check step ensures that no major alarms have been generated on the routers post the Y.1564 test. The Health check step validates that the routers are in the same state as before the Y.1564 performance validation testing.

The post-testing health check comprises, by way of example, a set of specified on-demand and scheduled tests.

Regarding on-demand tests, once the test setup is complete (for one or multiple sites), and a user selects 'Execute Now', the Y.1564 test(s) is triggered as an on-demand test(s). Test execution starts as soon as the user clicks a confirm button on a warning pop-up of the user interface. The test triggers with a pre-test alarm check and proceeds until a post-test alarm check (unless skip alarm/health check is selected by the user in the Test Options of the configuration stage).

In a multi-site scenario, a user can stop execution of a request (Work Order) while test execution is in progress. When the user attempts to stop execution of a work order, the NAS platform 200 completes all the ongoing tests and prevents new tests from being triggered.

Regarding scheduled tests, if a user clicks on 'Execute Later', a pop-up window appears prompting the user to enter a date and preferred time for the test. Tests can be scheduled, for example, 30 days in advance from the actual date of test and can be scheduled at any time during the day. Based on the date and time for which the test is scheduled, execution is triggered.

Users can edit scheduled Work Orders. For example, a user can make following changes until 15 minutes before the start of a scheduled test:
  1. Reschedule the test (edit the start time for the request)
  2. Delete sites from the work order After a user logs on, the user navigates to the 'Log History' page to see all the Y.1564 requests submitted. The user specifies filters on the screen such as start date, username, site Id, switch name etc. to populate the required view. For the requests submitted by the user, he/she will have edit access and for rest of the requests he/she will have a view only access.

User cannot add additional sites to the request once a request is submitted.

A user can submit any number of requests (work orders). Test execution for all sites in a request are triggered at the same time. Once a test is scheduled, user can cancel the work order prior to the scheduled start time. After scheduled start time or after test execution begins on any of the sites in a Work Order, user will get an option to 'Stop Execution'. In case of 'Stop Execution', all the current tests in progress will be completed and no new tests in the Work Order will be triggered.

If two users try to schedule tests for the same site during the same day, Work Order will be accepted on first come first serve basis. Second user will be shown an informational message—"Test has already been scheduled for this site on the same day. Please confirm if you want to proceed with submitting Y.1564 test for same site". However, this notification will not be displayed in case of an on-demand test request.

If a scheduled test is in progress and an on-demand test is requested by another user for the same LCC, the on-demand test is executed in between or in parallel to the scheduled sites. This execution is based on the below prioritization table. Each site within a Work Order (either on-demand or scheduled) is assigned a priority based on the reason selected at the time of test setup. In case of multi-site execution, platform will execute site with higher priority first.

| Request Type | Ticket Type | Priority |
|---|---|---|
| NOC Investigation (On-Demand) | Incident | P1 |
| NOC Investigation (Scheduled) | Incident | P2 |
| CIR Upgrade/Downgrade (On-Demand) | Change | P3 |
| CIR Upgrade/Downgrade (Scheduled) | Change | P4 |
| Planned Maintenance (On-Demand) | Change | P5 |
| Planned Maintenance (Scheduled) | Change | P6 |
| New Site Turn-up (On-Demand) | Change | P7 |
| New Site Turn-up (Scheduled) | Change | P8 |

Example

1. User 1 submits a request (Work Order 1) for a scheduled Y.1564 test for run at Jan. 1, 2000 at 12:00 AM for 'CIR upgrade' on 15 sites connected to LCC 'MADI'. At 12:00 AM, the platform starts running the test on the sites. At 12:25 AM, NOC Engineer finds out an issue with another site connected to the same LCC and wants to test the site. He/she submits a request (Work Order 2) with request type as 'NOC Investigation'. In this case, platform recognizes the new request and pauses the execution of Work Order 1 at a logical step (at the end of 'Post-Test Health Check' for the sites currently in progress), and triggers execution for Work Order 2. Once Work Order 2 is completed, platform resumes execution of any remaining sites in Work Order 1.
2. In continuation of example 1, while work order 1 has some sites on hold and work order 2 has some sites (but not all) in progress, NOC associate requests on-demand NOC investigation tests. Since the on-demand tests have higher priority than work order 1 and 2, work order 2 also potentially has sites put on hold to allow on-demand tests to run (depending on number of tests which can run concurrently).
3. If work orders for large number of sites are put on hold by pre-emptive higher priority tests and the end of the maintenance window approaches before the scheduled tests can be executed, the NOC associate is expected to take either of the following actions:
   i. Cancel the work orders otherwise the automation will commence the tests (outside the maintenance window) as soon as all other higher priority tests are completed
   ii. Call the NOC to create an INC ticket to continue with execution on the sites post maintenance window.

The NAS platform 200 supports concurrency and adjacency concepts during performance validation testing. The Y.1564 test automation application of the NAS 200 supports concurrent test runs on multiple devices. As per the design, multiple Y.1564 tests are triggered from by the NAS platform 200 at a time (multiple sites within a market or LCC as well as across market or LCC). The platform 200 is also capable of throttling the number of device connections—2 connections at a time at AGG routers and 1 connection at a time at CSRs. If more than two connection requests are made for an AGG router, connection throttling will become active to make sure that at any given time there are only two active connections to the device and the rest are queued by the platform. This feature ensures availability of routers for other automations (outside NAS) and users manually trying to connect to the routers.

There are a few device and system level constraints that will be used to determine number of sites for execution:
1. No. of simultaneous sites for execution within a LCC. This will be a configurable value. This determines maximum number of sites within a LCC that can be executed in parallel at a time. This value will be determined by the mobile wireless data network service provider keeping in view the fact that Y.1564 tests will bring live traffic down.
2. Two adjacent sites cannot be executed at the same time
3. Bandwidth of the tests (Currently a maximum of 650 Mbps per test interface)
4. Burst test (One burst test per test port on the verifier) on EXFO system
5. Two simultaneous connections on an Agg Router at a time.

Example: Assume that maximum number of simultaneous executions in a LCC is set to 5. If user submits a request for Y.1564 test on 10 sites (connected to one LCC) at 12:00 AM.

At 12:00 AM, 5 requests are triggered based on the prioritization table. The remaining 5 sites will queue until execution of one of the sites is complete.

Per the connection limit constraint (currently 2) number of active executions on the Agg router will be 2 and the remaining 3 requests will be queued and will be retrying.

Once one of the current executions is complete at Agg router, the free connection will be utilized for another CSR site. Connection limit constraint doesn't impact end to end process. The limit is only at a device level for commands to be executed on the device (as opposed to the site limit placed on the LCC which does impact number of end-to-end tests running concurrently).

This process repeats until execution for all sites is complete.

The NAS platform 200 also supports the concept of "site adjacency." In that regard, an adjacency algorithm is implemented to prevent adjacent cell sites from being taken down for testing at the same time. This helps to maintain subscriber connectivity to the network when cell sites have overlapping RF coverage. This feature is implemented as an API to return a Boolean result. Provided two cell sites, the algorithm calculates the distance between the two sites and based on a configurable distance threshold (i.e. 5 miles) will respond with "True" if they are within the distance threshold and "False" if they are not.

1. For concurrent execution on multiple sites within a market/LCC, trigger Y.1564 test for the first site (in the order added by user)
2. Pick up second site in queue and calculate distance between site 1 and site 2 at run time.

If the distance between sites is above threshold (false), trigger Y.1564 test on site 2

If the distance between sites is not above the threshold, add site 2 to pending queue and pick up site 3 for distance calculation 3. If none of the sites pending execution are above the required distance threshold, run only one site test at a time
4. Once any site completes execution, perform distance calculation and site selection for rest of the sites iteratively. The platform 200 takes into account the distance as one of the inputs along with other constraints before picking up the next site for execution.

The following describes an example of how the NAS platform handles exception states. When a response from the systems (Health Check API, EXFO) or the devices (CSR, Agg routers (Cisco and Nokia)) does not match with the expected output, an error is raised. Based on the execution step, rollback is triggered (if needed) and all configuration changes are reverted on the devices. If rollback is not needed, (e.g., for test restoration step), automation continues with the next step in the process flow.

Three error conditions are defined: Warning Condition, Medium Severity Condition, and Critical Condition. For 'Medium Severity' and 'Critical' conditions, a Netcool alarm is raised with varying 'Priority' and 'Urgency'. A High Priority-High Urgency alarm indicates that user intervention is required immediately. A Low Priority-Low Urgency alarm indicates that an automation affecting error occurred, but user intervention is not required immediately.

In the case of Test Restoration, the rollback action will be to proceed with execution, the Netcool action will be to raise a critical error and the UI action will be to display a 'red' alert.

status: Pass, Pre-health check status: Pass, Test readiness: Pass, Test restoration: Pass, Post-alarm check status: Pass, Post-health check status: Pass.

In the case of a failed test procedure, the CRQ/INC is modified by adding the following: Y.1564 test automation request ID; Site ID; Overall Y.1564 test status: Fail; if pre-test alarm check fails, provide the condition and severity (Alarm type, severity and alarm name); if pre-test health check fails, provide the list of showstopper alarms, items of interest & warnings on the site; if test readiness fails, provide the point of failure in automation flow and impacted device(s); if test execution fails to trigger i.e. failed to invoke

| Error Condition | Description | Automation Action | Fault Raised | UI Action | Ticket Priority and Urgency (Netcool) | Rollback Applicable? (Y/N) |
|---|---|---|---|---|---|---|
| Warning Condition | A Warning condition indicates that a non-process affecting error occurred during the automation | Proceed with execution | N/A | Display a warning condition to the user (yellow color) | N/A, N/A | N/A |
| Medium Severity Condition | A Medium Severity condition indicates that a process affecting error occurred during the automation. This condition is raised when attempted rollback is successful and devices are restored | Stop Execution, attempt rollback | Raise an alarm in fault management platform | Display a Medium Severity Condition to the user (Orange color) | Low, Low | Yes |
| Critical Condition | A Critical condition indicates that a process affecting error occurred during the automation. This condition is raised when attempted rollback is unsuccessful and devices couldn't be restored | Stop Execution, attempt rollback | Raise an alarm in fault management platform | Display a Critical Condition to the user (Red color) | High, High | Yes |

8. Post-alarm check (executed if "skip alarm check" checkbox is not selected in test setup).

Upon completion of the testing, during 480 the performance validation platform generates a results report. By way of example, such results are provided by way of attachment to the initially generated performance validation request. By way of a particular illustrative example, upon completing &.1564 performance validation testing, depending upon the result of test, a CRQ/INC (request) ticket is augmented with additional information such as the following (results-based information sets):

In the case of successful completion of the testing, the CRQ/INC request ticket is modified by adding the following: Y.1564 test automation request ID, Site ID, Overall Y.1564 test Status: Pass, Sub test results: Ramp—Pass/Fail, Burst—Pass/Fail, Svc. Perf—Pass/Fail, Pre-alarm check Y.1564 test from EXFO, provide a message stating that 'EXFO API failed—unable to trigger test'; Sub-Test Execution results: Burst test result—Pass or Fail, Ramp test result—Pass or Fail, Service Performance result—Pass or Fail; if test restoration fails, provide the point of failure in automation flow and impacted device(s); if post-test alarm check fails, provide the condition and severity; if post-test health check fails, provide the list of showstopper alarms, items of interest, warnings on the site.

The above details are added to the CRQ/INC request ticket structure to enable end-to-end visibility and thereby facilitate performing a root cause analysis and remediation in case of a failure scenario.

Figure 5:
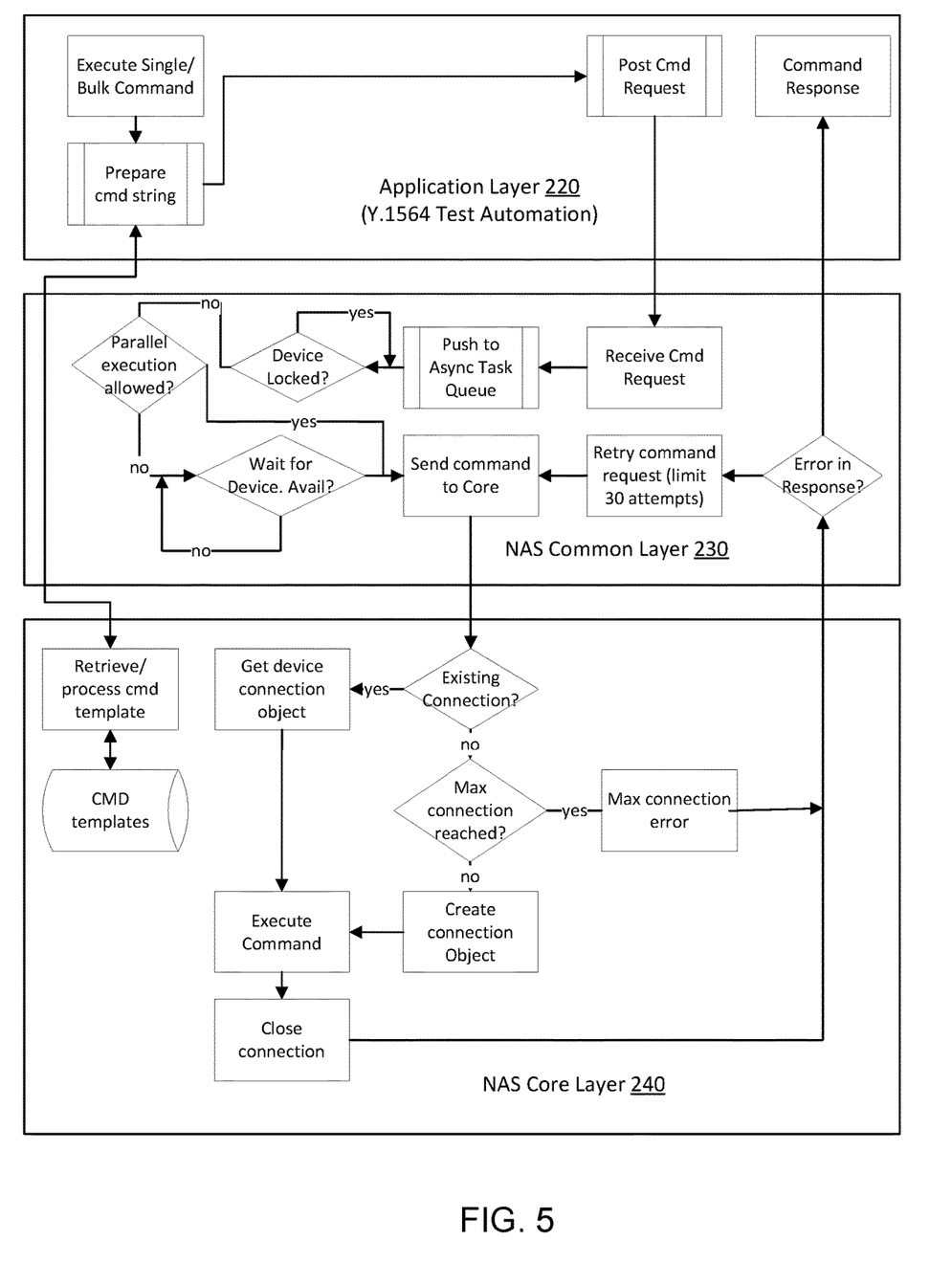
FIG. 5 is a flowchart summarizing operations for an exemplary execution stage of the overall performance validation summarized in FIG. 4 in accordance with the disclosure.

Turning to FIG. 5, a detailed flow diagram provides an illustrative example of an automated performance validation executed by the NAS platform 200 during performance validation execution operation 470 (of FIG. 4). Such performance validation is used, for example (per FIG. 1), to carry out validating quality of service (QoS) and performance of particular mobile wireless telecommunications (telco) provided Ethernet backhaul connections between service provider cell site routers (CSR) and aggregation routers (AGG) located at local connectivity centers (LCC). By way of example, the automated testing (Y.1564 Test Automation) acts on a triggering event arising from a user (e.g. Network Field Engineer (NFE) or a Network Operation Center (NOC) Engineer) action.

The automated testing arrangement summarized in FIG. 5 handles exceptions during any stage in the automated testing and raises alarms via an alarm and fault management system (e.g., Netcool). In the illustrative example, the Y.1564 testing facilitates determining a level of QoS currently being delivered by particular backhaul network Ethernet service providers.

With continued reference to FIG. 5 and previously discussed FIG. 2, in the illustrative example of the current disclosure, the Core Layer 240 interfaces to the external network elements 250 and systems during performance validation. The Common Services Layer 230 provides concurrency and locking services/functionality for command execution requests. For Y.1564 test automation, testing access to CSR and AGG devices is managed via the Common Services Layer 230 because other automations also interact with these particular devices. This is accomplished, for example, by a Command Runner service. The Application Layer 220 (including the Y.1564 Test Automation component) submits requests to the Command Runner. See e.g., Post Cmd Request-to-Receive Cmd Request transition in FIG. 5.

Thereafter, within the Common Services Layer 230, the received requests are managed by queuing them using RabbitMQ so that an API can handle and track the state of many requests from the same or multiple applications. This arrangement allows the Common Services Layer 230 to be taken down and serviced as needed, even as the requests take considerable time to complete, and when started again, processing of requests will continue without needing resubmission by applications. This arrangement allows the NAS platform 200 to be flexible and dynamic while still providing a responsive service for the Application Layer 220 and the User Interface Layer 210.

Workers process the requests as they are placed on the queue based on rules dictated by the concurrency policies (i.e. serial or parallel) and locking constraints. A token is provided to the requestor which is used to obtain updates on the status of the request and any output. With this approach the Command Runner maintains the REST principle of being stateless.

In the illustrative example of Y.1564 Testing, locking is required due to potential contention with a VLAN failover solution that operates on the CSR and AGG routers to adjust the route cost to move traffic from the primary VLAN to the secondary VLAN when certain alarm conditions are present. The common services layer locking mechanism prevents VLAN and Y.1564 Testing from accessing the same devices at the same time. Locking and concurrency also come into play when multiple Y.1564 Testing sessions are running at the same time.

The Core Layer 240, operating as an interface to external components, implements vendor-specific commands and/or constraints. For example Nokia and Cisco routers both implement the OSPF routing protocol. However, the commands used to make configuration changes for each vendor are very different. The Core Layer 240 accommodates such differences and allows different sets of vendor specific commands to achieve a specific purpose. The command sets are maintained separately from the application code in templates stored in the Core Layer 240 so they can be maintained easily.

The External services 250 that have REST APIs such as SMART Remedy, and Health Check API do not require concurrency or locking logic. The Application Layer 220 can directly interface to such services.

The Core Layer 240 implements access to external databases. By way of example, the MCL and Netcool services (of the external services 250) are implemented using SQL templates maintained by the Core Layer 240 that provide a layer of abstraction between the tool and the automation jobs as well as to promote code reuse between automation and orchestrations. For example, MCL access is a core service that is used by multiple solutions to obtain CSR and AGG router device information.

The Common Services Layer 230 provides support of various other functions such as user authentication and access control leveraging existing security and access approval process. The Common Services Layer 230 is integrated with mobile wireless data network service provider's standard Directory Services so that common approval processes for authorizing users to applications can be followed. Users are assigned to LDAP groups defined for each role, and a service within the Common Services Layer 230 reads the group assigned to authorize the user within the application.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification is construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by a network automation system platform, for automated multi-node performance validation testing of routers on a communications network, the method comprising:
    acquiring a test configuration for executing a multi-node router performance validation test, wherein the test configuration identifies:
        a multi-node network performance test, carried out by an application layer, that specifies a technology-independent test script that is generic to particular technologies for providing performance validation-related services, and
        a node group comprising a set of routers upon which the multi-node network performance test is to be performed;
    performing a pre-validation pre-test of the set of routers including a pre-test health check on each router of the set of routers; and
    executing the multi-node network performance validation test by the application layer issuing requests to a core layer comprising a set of technology-specific services that issue, in accordance with the application layer requests, technology-specific commands to external services during performance validation of nodes within the node group; and
    receiving, by the core layer, a set of responses from the external services corresponding to execution of the set of technology-specific commands by the external services during performance validation testing of the node group.

2. The method of claim 1 further comprising:
    issuing, by the core layer in accordance with commands received from the application layer after the receiving, a set of technology-specific network production state restoration commands.

3. The method of claim 1 further comprising:
    issuing, by an application layer application, requests to a common services layer service callable by a multitude of application layer applications.

4. The method of claim 1 wherein the technology-specific commands comprise calls invoking performance validation testing performed by an external testing service.

5. The method of claim 1 wherein the network automation system platform implements a representational state transfer (REST) interface architecture for interfacing the application layer to the external services via the core layer.

6. The method of claim 1 wherein the application layer comprises a Y.1564 application for carrying out performance validation on a backhaul network node.

7. A network automation system platform on a computer system including a processor and a non-transitory computer-readable medium including computer-executable instructions that, when executed by the processor, facilitate the computer system carrying out a method for automated multi-node performance validation testing of routers on a communications network, the method comprising:
    acquiring a test configuration for executing a multi-node router performance validation test, wherein the test configuration identifies:
        a multi-node network performance test, carried out by an application layer, that specifies a technology-independent test script that is generic to particular technologies for providing performance validation-related services, and
        a node group comprising a set of routers upon which the multi-node network performance test is to be performed;
    performing a pre-validation pre-test of the set of routers including a pre-test health check on each router of the set of routers; and
    executing the multi-node network performance validation test by the application layer issuing requests to a core layer comprising a set of technology-specific services that issue, in accordance with the application layer requests, technology-specific commands to external services during performance validation of nodes within the node group; and
    receiving, by the core layer, a set of responses from the external services corresponding to execution of the set of technology-specific commands by the external services during performance validation testing of the node group.

8. The network automation system platform of claim 7, wherein the method further comprises:
    issuing, by the core layer in accordance with commands received from the application layer after the receiving, a set of technology-specific network production state restoration commands.

9. The network automation system platform of claim 7, wherein the method further comprises:
    issuing, by an application layer application, requests to a common services layer service callable by a multitude of application layer applications.

10. The network automation system platform of claim 7 wherein the technology-specific commands comprise calls invoking performance validation testing performed by an external testing service.

11. The network automation system platform of claim 7 wherein the network automation system platform implements a representational state transfer (REST) interface architecture for interfacing the application layer to the external services via the core layer.

12. The network automation system platform of claim 7 wherein the application layer comprises a Y.1564 application for carrying out performance validation on a backhaul network node.

13. The network automation system platform of claim 7, wherein connectivity of the set of routers is confirmed during the performing pre-validation pre-test of the set of routers.

14. The network automation system platform of claim 7, wherein the multi-node network performance validation test includes determining bandwidth limitations of the set of routers.

15. The network automation system platform of claim 7, wherein the multi-node network performance validation test includes determining a number of concurrent executions allowed on an aggregation router.

16. The method of claim 1, wherein connectivity of the set of routers is confirmed during the performing pre-validation pre-test of the set of routers.

17. The method of claim 1, wherein the multi-node network performance validation test includes determining bandwidth limitations of the set of routers.

18. The method of claim 1, wherein the multi-node network performance validation test includes determining a number of concurrent executions allowed on an aggregation router.

\* \* \* \* \*